(Model.)
S. J. FREED.
Oscillator for Platform Wagons.
No. 241,954. Patented May 24, 1881.
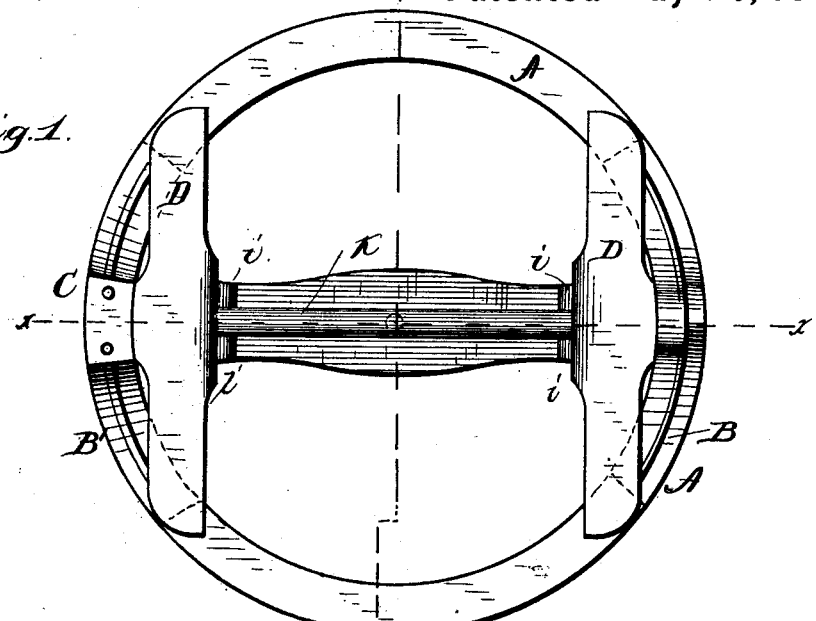
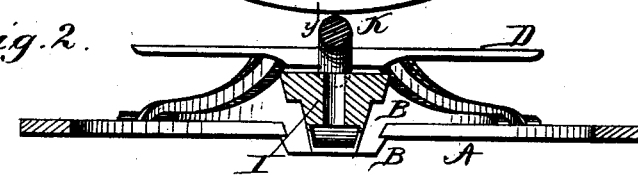
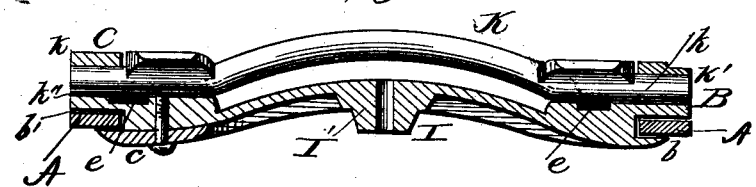
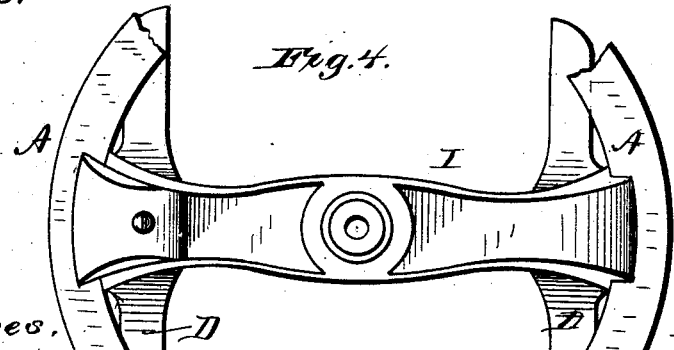
Witnesses.
Inventor.

UNITED STATES PATENT OFFICE.

SAMUEL J. FREED, OF RACINE, WISCONSIN.

OSCILLATOR FOR PLATFORM-WAGONS.

SPECIFICATION forming part of Letters Patent No. 241,954, dated May 24, 1881.

Application filed January 21, 1881. (Model.)

*To all whom it may concern:*

Be it known that I, SAMUEL J. FREED, of Racine, in the county of Racine, and in the State of Wisconsin, have invented certain new and useful Improvements in Oscillators for Platform-Wagons; and I do hereby declare that the following is a full, clear, and exact description thereof.

My invention relates to platform-wagons; and it consists in a novel device for hinging the body to the front gear.

In the drawings, Figure 1 is a plan view of my invention. Fig. 2 is a section on line $y\ y$, Fig. 1. Fig. 3 is a section on line $x\ x$, Fig. 1; and Fig. 4 is a bottom view, with part of the circle broken away.

A is the lower circle of a fifth-wheel, which, as usual, is rigidly fastened to the platform-gear, and B B' are segments which I substitute for the upper circle. These segments are connected by a bar, I, usually curved, as shown in Fig. 3, and which may either be made in one piece with them or separately and joined thereto. The segment B is recessed at $b$, and the segment B' is rabbeted at $b'$ to receive the circle A, and when the segments are in position a strip, $c$, attached to the under side of segment B', serves to prevent it from being lifted off.

K is the hinge or oscillator-bar, centrally curved, but having a straight journal, $k$, at each end to conform to the shape of the connecting-bar I and the bearings in the segments, which are marked $k'\ k''$. The cap of bearing $k'$ is cast or made solid with its segment, but I provide a removable cap, C, for the bearing $k''$ and secure it in place when the parts are together by screws or bolts. To prevent vibration I make recesses in the bearings and deposit therein rubber blocks $e\ e$, which, when the bar K is in place, bear up against the journals.

D D are plates, which are rigidly attached to or form part of the oscillator-bar K, and upon these are secured the beams of the wagon-body. To adjust the hinge or oscillator bar to its position, remove cap C, slightly depress one end of bar K, and thrust it into bearing $k'$, gradually lowering the other end until its journal lies flat upon the bearing $k''$; then replace and secure cap C. To place the bar I and segments in position on the circle, elevate the segment B' and thrust segment B onto the circle, so that the groove $b$ spans it. The other segment may now be dropped into place and the plate $c$ bolted to its place. The plate $c$ and under lip of the groove $b$ only extend under one-half the width of the circle, that room may be left for the attaching-bolts, by which the circle is made fast to the front gear.

It is designed that the front cross-beams of the wagon-body shall rest upon and be secured to the plates D D, which will place the length of the body at right angles to the bar I, so that should one wheel meet with an obstruction that side of the gear would yield without straining the front gear or affecting the body. The plates D are made heavier as they approach the bar K, and the degree of deflection is limited by the contact of these thick portions of the plates with the shoulders $i\ i$ on the bar I, and thus contact of the ends of the plates with the circle is prevented.

My device is compact and strong, and may be easily adjusted to any platform-wagon.

What I claim as my invention, and desire to secure by Letters Patent, is—

1. The combination of bar I, grooved segment B, rabbeted segment B', plate $c$, and the circle A, as set forth.

2. The combination of bar I, having shoulders $i\ i$, with the plates D D, as set forth.

In testimony that I claim the foregoing I have hereunto set my hand this 8th day of January, 1881.

SAMUEL J. FREED.

Witnesses:
E. B. FISH,
S. S. STOUT.